(12) United States Patent
Hall

(10) Patent No.: US 9,228,544 B2
(45) Date of Patent: Jan. 5, 2016

(54) INTERNAL COMBUSTION ENGINE AND METHOD FOR OPERATING AN INTERNAL COMBUSTION ENGINE

(75) Inventor: Matthew Hall, Ludwigsburg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/346,621

(22) PCT Filed: Sep. 7, 2012

(86) PCT No.: PCT/EP2012/003753
§ 371 (c)(1),
(2), (4) Date: Mar. 21, 2014

(87) PCT Pub. No.: WO2013/041188
PCT Pub. Date: Mar. 28, 2013

(65) Prior Publication Data
US 2014/0230798 A1  Aug. 21, 2014

(30) Foreign Application Priority Data

Sep. 23, 2011 (DE) .......................... 10 2011 114 305

(51) Int. Cl.
*F02N 19/10* (2010.01)
*F02M 31/02* (2006.01)
(Continued)

(52) U.S. Cl.
CPC ............... *F02M 31/02* (2013.01); *F01M 5/001* (2013.01); *F01N 5/02* (2013.01); *F02F 1/4264* (2013.01); *F01N 13/10* (2013.01); *F01N 2240/36* (2013.01); *F02B 37/001* (2013.01); *Y02T 10/16* (2013.01)

(58) Field of Classification Search
CPC ....... F01N 13/10; F02M 31/02; F02F 1/4264; F02N 19/10; F01P 2060/16; F01P 2037/02

USPC ......................... 123/543, 179.1, 142.5 R, 320
See application file for complete search history.

(56) References Cited

U.S. PATENT DOCUMENTS 1,785,108 A    12/1930  Bastien
2,713,332 A *   7/1955  Beardsley .................. 123/41.28
(Continued)

FOREIGN PATENT DOCUMENTS

CN        201924987        8/2011
DE        30 02 098        7/1981
(Continued)

OTHER PUBLICATIONS

Erjavec, Jack. "Automotive Technology: A Systems Approach", pp. 226-227. Google Books, 2010. Web. <http://books.google.com/books?id=0T30OyFiNKQC&pg=PA226#v=onepage&q&f=false>.*

(Continued)

*Primary Examiner* — Lindsay Low
*Assistant Examiner* — Kevin Lathers
(74) *Attorney, Agent, or Firm* — Henry M. Feiereisen LLC

(57) ABSTRACT

The invention relates to an internal combustion engine (1) with a crankcase (3) and a cylinder head (4) having exhaust ports (9) feeding into an exhaust manifold (10) for exhaust gas from the combustion chambers (5) of the internal combustion engine (1). Provision is hereby made for the cylinder head (4) to include at least one region of a heating channel (12) which is different from the exhaust ports (9) and the exhaust manifold (10) and has an inlet side (14) branching from one of the exhaust ports (9) or the exhaust manifold (10), and which is flowed through by an exhaust mass flow that is adjustable by an actuator (13). The invention further relates to a method for operating an internal combustion engine (1).

13 Claims, 1 Drawing Sheet

(51) Int. Cl.
*F01M 5/00* (2006.01)
*F01N 5/02* (2006.01)
*F02F 1/42* (2006.01)
*F01N 13/10* (2010.01)
*F02B 37/00* (2006.01)

(56) References Cited

U.S. PATENT DOCUMENTS

| | | | | |
|---|---|---|---|---|
| 2,718,221 | A | * | 9/1955 | Leach .......................... 123/661 |
| 4,805,403 | A | * | 2/1989 | Bowman et al. ................. 60/320 |
| 2010/0175374 | A1 | | 7/2010 | Steiner et al. |

FOREIGN PATENT DOCUMENTS

| | | |
|---|---|---|
| DE | 30 32 090 | 4/1982 |
| DE | 33 22 063 | 12/1984 |
| DE | 101 07 018 | 9/2002 |
| DE | 10 2009 000 214 | 9/2010 |
| EP | 1 605 145 | 12/2005 |
| JP | 61-135911 | 6/1986 |
| JP | 2008 285 997 | 11/2008 |

OTHER PUBLICATIONS

International Search Report issued by the European Patent Office in International Application PCT/EP2012/003753.
Chinese Search Report issued on Aug. 5, 2015 with respect to counterpart Chinese patent application 2012800462851.
Translation of Chinese Search Report issued on Aug. 5, 2015 with respect to counterpart Chinese patent application 2012800462851.

* cited by examiner

INTERNAL COMBUSTION ENGINE AND METHOD FOR OPERATING AN INTERNAL COMBUSTION ENGINE

CROSS-REFERENCES TO RELATED APPLICATIONS

This application is the U.S. National Stage of International Application No. PCT/EP2012/003753, filed Sep. 7, 2012, which designated the United States and has been published as International Publication No. WO 2013/041188 and which claims the priority of German Patent Application, Serial No. 10 2011 114 305.3, filed Sep. 23, 2011, pursuant to 35 U.S.C. 119(a)-(d).

BACKGROUND OF THE INVENTION

The invention relates to an internal combustion engine with a crankcase and a cylinder head having exhaust ports which feed into an exhaust manifold for exhaust gas from combustion chambers of the internal combustion engine. The invention further relates to a method for operating an internal combustion engine.

Internal combustion engines of the afore-mentioned type are known in the art. They include, in particular, the crankcase, also referred to as engine block, and the cylinder head. The crankcase and the cylinder head jointly form the combustion chambers of the internal combustion engine, with the crankcase for example at least largely including the combustion chambers in the form of open-edged recesses in the direction of the cylinder head and with the cylinder head merely closing the latter. The crankcase may further include a cooling jacket and an engine casing of the internal combustion engine. Gas exchange members of the internal combustion engine are oftentimes provided in the cylinder head, i.e. in particular valves. The gas exchange members are provided for intake or discharge of air or exhaust gases into the combustion chambers. A camshaft of the internal combustion engine may also be arranged in the cylinder head. Exhaust gas flows out of the combustion chambers of the internal combustion engine, in particular via the gas exchange members, into the exhaust ports. From there, it enters the exhaust manifold and then in an exhaust gas tract of the internal combustion engine for subsequent release into the environment of the internal combustion engine, in particular via an exhaust gas purification device.

In a warm-up operation of the internal combustion engine, i.e. at low temperature of the internal combustion engine, undesirable friction forces are produced in the latter, for example between the walls of the combustion chambers and pistons arranged in the combustion chambers. It is therefore the objective to increase the temperature of the internal combustion engine as quickly as possible and thus to shorten the warm-up operation so as to minimize the frictional forces. Exhaust gas flowing out the combustion chambers of the internal combustion engine rapidly heats up as a consequence of combustion processes taking place in the combustion chambers. It is therefore known in the art, for example from DE 33 22 063 A1, to use the temperature of the exhaust gas to heat the lubricating oil of a lubricating oil circuit of an internal combustion engine. For this purpose, the mentioned document describes the provision of a heat pipe between exhaust-gas-carrying parts and the lubricating oil circuit. However, this approach has the disadvantage that the transmitted heat flow (heat quantity per unit time) is limited by the heat pipe on one hand, and the lubricating oil is merely heated on the other hand so that the warm-up operation of the internal combustion engine is only slightly shortened and frictional forces are only indirectly influenced.

SUMMARY OF THE INVENTION

It is therefore an object of the invention to provide an internal combustion engine which obviates the afore-mentioned disadvantages and reaches its operating temperature significantly faster than internal combustion engines known in the art. Thus, the duration of the warm-up operation is significantly reduced and overall efficiency of the internal combustion engine is improved.

This is achieved according to the invention in that the cylinder head includes at least a region of a heating channel which is different from the exhaust ports and or the exhaust manifold and has an inlet side which branches from one of the exhaust ports or the exhaust manifold and which can be flowed through by an exhaust gas mass flow that is adjustable by an actuator. The heat of the exhaust gas thus should not be supplied merely indirectly again to the internal combustion engine via a fluid, in particular lubricating oil, as known in the art. Rather, it is provided that the exhaust gas that flows out of the combustion chambers at least partly flows into the heating channel and is conducted by the heating channel to the regions of the internal combustion engine, in particular into the cylinder head, where particularly high frictional forces are caused at low temperature. The inlet side of the heating channel is hereby connected to at least one of the exhaust ports or the exhaust manifold so that exhaust gas from the exhaust port or the exhaust manifold is able to flow into the heating channel. It is to be noted in this context in particular that the heating channel is formed separately form the exhaust ports and the exhaust manifold, i.e. is different from these. Exhaust gas is thus conducted into the heating channel from when the heating channel branches from the exhaust port or the exhaust manifold in parallel relation thereto.

The exhaust gas mass flow, which flows through the heating channel, should hereby be adjustable by the actuator. The actuator can basically be located at any position. Preferably, however, it is situated in the heating channel, especially immediately after its inlet. The actuator is preferably configured as a cross-section adjusting member, which is controlled and/or regulated such that the heating channel is flowed through by the predefined exhaust mass flow or can be flowed through. In this way, a flow communication can be established by the actuator between the exhaust ports or the exhaust manifold and at least the cylinder head. Exhaust gas thus flows through the cylinder head not only via the exhaust ports or the exhaust manifold, when the actuator is open at least in part, but in addition also via the heating channel. The heating channel is hereby conducted especially in the cylinder head to regions which should be quickly warmed up during the warm-up operation of the internal combustion engine. The internal combustion engine thus reaches its operating temperature much faster compared to internal combustion engines known in the art.

The heating channel should preferably be flowed through only during the warm-up operation of exhaust gas. In addition or as an alternative, provision may be made to have exhaust gas flow through the heating channel during normal operation of the internal combustion engine that follows the warm-up operation in order to raise the temperature of the internal combustion engine. In this way, efficiency of the internal combustion engine can be increased in certain operating ranges of the internal combustion engine.

According to a refinement of the invention, the heating channel is provided only in the cylinder head or the heating channel extends additionally into the crankcase. According to a first embodiment of the internal combustion engine, the heating channel extends only through the cylinder head, i.e. is present in no other regions of the internal combustion engine. According to a preferred embodiment, it extends however in addition into the crankcase. For this purpose, a flow communication is established between a region of the heating channel in the cylinder head and a region of the heating channel in the crankcase. Preferably, this fluid communication is configured such that there is only need for placement of the cylinder head on the crankcase and securement thereto in order to establish the flow communication, when the internal combustion engine is installed. For example, the heating channel ports open-edged into a contact surface of the cylinder head, with which contact surface the cylinder head comes into contact, after installation, with the crankcase or a corresponding contact surface of the crankcase. The crankcase has a further mouth which corresponds to this open-edged mouth. A first region of the heating channel is accordingly located in the cylinder head and a second region in the crankcase. The first mouth is now associated to the first region and the other mouth to the second region. After installation of cylinder head and crankcase, the two regions of the heating channel are in flow communication via the complementary open-edged mouths.

According to a further refinement of the invention, the heating channel—as viewed in axial direction—spans over all combustion chambers of the internal combustion engine. Frequently, at least some of the combustion chambers of the internal combustion engine are arranged in longitudinal direction. This is particularly the case for in-line four-cylinder internal combustion engines and in-line six-cylinder internal combustion engines and the like. For internal combustion engines with combustion chambers in V-arrangement, several, especially two, combustion chamber groups with each preferably having a plurality of combustion chambers arranged axially in relation to one another, are provided. In this case, the heating channel spans at least the combustion chambers of one of the combustion chamber groups of the internal combustion engine in the axial direction. In this way, the cylinder head, especially in the area of the combustion chambers, is evenly heated, so that friction forces between piston and combustion chamber wall for all combustion chambers are reduced.

According to a refinement of the invention, the heating channel extends at least in some areas in parallel relation to at least one fluid conduit, especially oil conduit or water conduit. As a result, not only the cylinder head and/or the crankcase of the internal combustion engine can be directly heated. Rather, also the fluid should be heated by the hot exhaust gas flowing through the heating channel. For this purpose, the fluid conduit extends adjacent to the heating channel and parallel thereto. The distance between the heating channel and the fluid conduit—as viewed in radial direction—is hereby small enough to cause an effective heat transfer by heat conduction. Provision can be made in an especially preferred manner for the heating channel to extend through the fluid conduit, in particular in coaxial relationship. The heating channel is thus located in the fluid conduit and fluidly separated therefrom by a wall, preferably of a highly heat conductive material. For example, the heating channel is configured in the form of a heat pipe, which is arranged in the fluid conduit at least in some areas.

According to a refinement of the invention, several heating channels are associated to respectively different combustion chamber groups. As already stated above, the combustion chambers are divided into combustion chamber groups, especially for internal combustion engines having V-arrangement of the combustion chambers. In the presence of several combustion chamber groups, it is advantageous to associate a separate heating channel to each combustion chamber group to enable an even heating of the cylinder head or the crankcase in the area of the combustion chamber groups.

According to a refinement of the invention, the heating conduit—as viewed in flow direction of the exhaust gas—is realized in parallel relation to a primary exhaust gas flow by the exhaust ports and the exhaust manifold, and exhaust gas conducted through the heating channel flows from its inlet side to an outlet side ending downstream of the inlet side into one of the exhaust ports or the exhaust manifold. The exhaust gas thus flows out of the combustion chambers of the internal combustion engine through the exhaust ports into the exhaust manifold and from there in the direction of the exhaust gas tract. This exhaust gas constitutes the primary exhaust gas flow. Exhaust gas branched off the exhaust ports or the exhaust manifold into the heating channel forms a secondary exhaust gas flow which has a smaller exhaust gas mass flow than the primary exhaust gas flow. The secondary exhaust gas flow through the heating channel thus extends in substantial parallel relation to the primary exhaust gas flow. Exhaust gas thus flows on the inlet side of the heating channel from the exhaust ports or the exhaust manifold into the heating channel and is supplied again at the outlet side of the heating channel to the primary flow in the exhaust port or the exhaust manifold. The heating channel thus constitutes a fluid communication between its inlet side and its outlet side.

According to a refinement of the invention, a turbine of an exhaust-gas turbocharger is fluidly connected to the exhaust manifold downstream of the mouth of the outlet side or the heating channel feeds directly the exhaust gas to the turbine. Thus, the internal combustion engine has an exhaust-gas turbocharger provided to compress air by a compressor and to supply air at the realized higher pressure level to the combustion chambers. In this way, efficiency of the internal combustion engine can be improved. The compressor of the turbocharger is driven by the turbine thereof, which is swept over by exhaust gas. Kinetic energy is hereby drawn from the exhaust gas and converted into mechanical rotation energy which is used to drive the compressor. Provision is now being made for the outlet side to end upstream of the turbine of the exhaust-gas turbocharger again in the exhaust ports or the exhaust manifold. As an alternative, the heating channel may also feed directly into the turbine for conducting the exhaust gas from the secondary gas flow thereto.

The invention further relates to a method for operating an internal combustion engine, especially an internal combustion engine in accordance with the foregoing, wherein the internal combustion engine has a crankcase and a cylinder head which includes exhaust ports feeding into an exhaust manifold for exhaust gas from the combustion chambers of the internal combustion engine. Provision is hereby made for the cylinder head to have at least a region of a heating channel which is different from exhaust ports and exhaust manifold and has an inlet side which branches from one of the exhaust ports or the exhaust manifold, with a mass flow flowing through the heating channel being adjusted by an actuator. The internal combustion engine can be further refined according to the above description.

According to a refinement of the invention provides, the actuator is opened when a fluid temperature of the internal combustion engine, in particular an oil temperature or water temperature, is smaller than an operating temperature. This is the case in particular during the warm-up operation of the internal combustion engine, when the temperature of the overall internal combustion engine is below the operating temperature. The actuator is thus opened in particular during the warm-up operation. Provision may, however, also be made for the actuator to open during normal operation of the internal combustion engine which follows the warm-up operation in order to warm up the fluid by exhaust gas flowing through the heating channel and to correspondingly increase the fluid temperature. This is continued until the fluid temperature reaches the operating temperature. When the fluid temperature corresponds to the operating temperature or is greater than the latter, the actuator is closed again. In particular, the actuator is adjusted for control and/or regulation such that the fluid temperature corresponds to the operating temperature at any time. When referring to the described opening, also a merely partial opening is to be understood as well.

According to a refinement of the invention, the fluid is conveyed from a fluid reservoir through a fluid conduit which extends at least in part parallel to the heating channel, and back to the fluid reservoir. To heat the fluid as rapidly as possible and to bring it to the operating temperature, provision is made for the fluid to be conveyed from the fluid reservoir in the direction of the internal combustion engine or at least to the heating channel which extends at least through the cylinder head. The fluid flows through the fluid conduit which has at least some areas arranged in parallel relation to the heating channel. Such an embodiment has been already referred to above. After flowing through the fluid conduit, the now heated fluid is conveyed back to the fluid reservoir. In this way, both the internal combustion engine and the fluid are heated in the fluid reservoir by the exhaust gas.

BRIEF DESCRIPTION OF THE DRAWING

Exemplary embodiments of the invention will now be explained in greater detail with reference to the drawing, without limiting the invention. It is shown in.

DETAILED DESCRIPTION OF PREFERRED EMBODIMENTS

Figure 1:
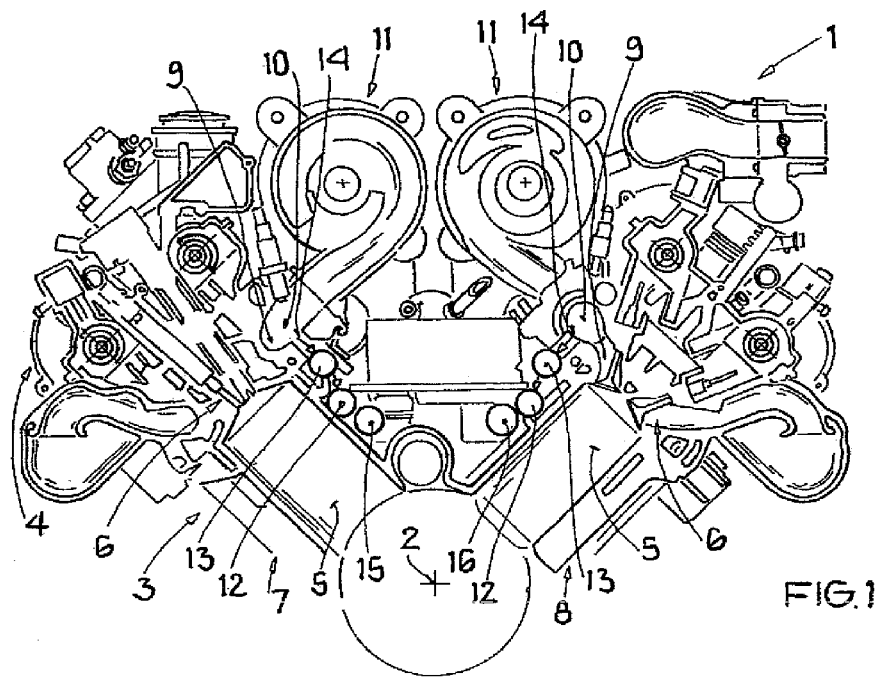
FIG. 1 a cross section through an internal combustion engine.

FIG. 1 shows a cross section through an internal combustion engine 1, with the plane of intersection extending perpendicular to a longitudinal axis 2 of the internal combustion engine 1. The internal combustion engine 1 has a crankcase 3 and a cylinder head 4, with the crankcase 3 having combustion chambers 5 which are bounded at the top by the cylinder head 4. Pistons, not shown here, of the internal combustion engine 1 are arranged in the combustion chambers 5 or cylinders and interact with a crankshaft to provide a driving torque. Gas-exchange elements 6, in particular valves, are arranged in the cylinder head 4, and are provided for the intake of air into the combustion chambers 5 and the discharge of exhaust gas therefrom. It can easily be seen that the combustion chambers 5 of the internal combustion engine 1 are configured in a V-arrangement so that a first combustion chamber group 7 and a second combustion chamber group 8 are arranged on opposite sides of the internal combustion engine 1. Each of the combustion chamber groups 7 and 8 has at least one combustion chamber 5, preferably a plurality of combustion chambers 5, which are arranged axially one behind the other. After combustion in the combustion chambers 5, exhaust gas flows through the respective gas-exchange elements 6 via exhaust ports 9 into an exhaust manifold 10. Preferably, an exhaust port 9 is associated to each combustion chamber 5. Each of the exhaust ports 9 feeds into the exhaust manifold 10. The exhaust manifold 10 is thus provided to collect the exhaust gases from the exhaust ports 9. Exhaust gas is supplied via the exhaust manifold 10 to a compressor of an exhaust-gas turbocharger 11, wherein in the exemplified embodiment shown here, each combustion chamber group 7 and 8 is respectively associated to an exhaust-gas turbocharger 11.

To shorten the time period of warming-up during a warm-up operation of the internal combustion engine 1, provision is made for the cylinder head to have at least a region of a heating channel 12 which is different from the exhaust ports 9 and the exhaust manifold 10. It is here again clearly shown that a heating channel 12 is respectively associated to each of the combustion chamber groups 7 and 8. As an alternative, it is also possible to provide merely a common heating channel 12 for both combustion chamber groups 7 and 8. The heating channels 12 are connected via actuators 13 with the exhaust ports 9 or the exhaust manifold 10. In the exemplified embodiment shown, an inlet side 14 branches, immediately after uniting the exhaust ports 9, into the exhaust manifold 10 from the latter. By using the actuators 13, which are configured as cross-section adjusting members, preferably as valves, the exhaust gas mass flows flowing through the heating channels 12 can be adjusted for control and/or regulation, in particular separately from one another. Especially preferred is the arrangement of the heating channels 12 at least partly in the region of fluid conduits 15 and 16, with the fluid conduit 15 being configured as water conduit and the fluid conduit 16 as oil conduit.

Figure 2:
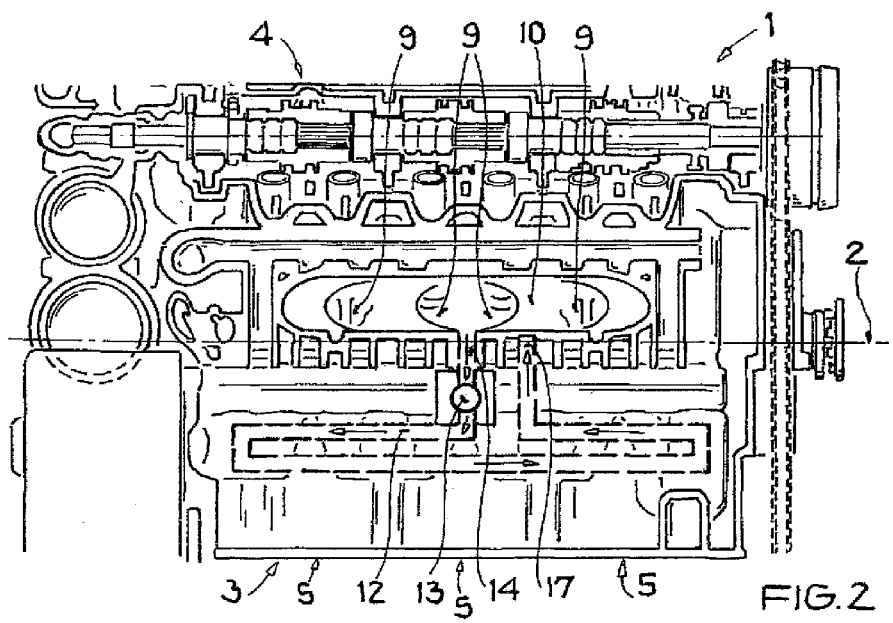
FIG. 2 a longitudinal section through the internal combustion engine.

FIG. 2 shows a longitudinal section through the internal combustion engine 1, with the longitudinal axis 2 lying in the plane of intersection. It is readily apparent that the heating channel 12 with its inlet side 14 feeds into the exhaust manifold 10 such as to be acted upon directly by exhaust gas flowing out of the exhaust ports 9. In contrast thereto, an outlet side 17 of the heating channel 12 ends in the exhaust manifold 10 in such a way as to lie—as viewed in the axial direction—at a distance to or offset to the exhaust ports 9 or their mouths into the exhaust manifold 10. The outlet side 17 is thus not directly exposed to exhaust gas inflowing from the exhaust ports 9 into the exhaust manifold 10. The kinetic energy of the exhaust gas that enters via the exhaust ports 9 into the exhaust manifold 10 thus causes a back pressure by which the exhaust gas on the inlet side 14 is urged into the heating channel 12.

Depending on a position of the actuator 13, the exhaust gas can thus flow through the heating channel 12 from its inlet side 14 in the direction of its outlet side 17. On the outlet side 17, it re-enters the exhaust manifold 10 and is discharged by the exhaust manifold together with the main exhaust gas flow which does not flow through the heating channel 12. It is readily apparent that the heating channel 12 shown here spans, as seen in the axial direction, over all combustion chambers of the internal combustion engine 1. In this way, it is ensured that the internal combustion engine 1, in particular in the area of the combustion chambers 5, is evenly heated. The heating channel 12 is at least present in the cylinder head 4. In the exemplified embodiment shown here, the heating channel traverses the crankcase 3 in addition. Thus, a first region of the heating channel 12 is disposed in the crankcase 3 and a second region is disposed in the cylinder head 4. The regions are arranged such as to extend open-edged through contact surfaces of the crankcase 3 and the cylinder head 4 via which they are connected to one another after installation of the internal combustion engine 1 so that a flow communication is automatically established between the first region and the second region of the heating channel 12 after mounting the cylinder head 4 to the crankcase 3.

What is claimed is:

1. An internal combustion engine, comprising:
   a crankcase;
   a cylinder head having a plurality of groups of combustion chambers arranged at opposite sides of the internal combustion engine, and exhaust ports associated with the combustion chambers in one-to-one correspondence and feeding into an exhaust manifold for exhaust gas from the exhaust ports of the combustion chambers of all of the groups of the combustion chambers of the internal combustion engine, wherein the cylinder head includes regions of heating channels which are different from the exhaust ports and the exhaust manifold, said heating channels being associated with the groups of said combustion chambers in one-to-one correspondence, each of said heating channels having an inlet side branching from one of the exhaust ports or from the exhaust manifold; and
   actuators configured to adjust an exhaust gas mass flow flowing through the heating channels and connecting the heating channels with the exhaust ports or the exhaust manifold.

2. The internal combustion engine of claim 1, wherein the heating channels are provided only in the cylinder head.

3. The internal combustion engine of claim 1, wherein the heating channels are sized to extend into the crankcase.

4. The internal combustion engine of claim 1, wherein the heating channels—as seen in an axial direction—are sized to span over all combustion chambers of the internal combustion engine.

5. The internal combustion engine of claim 1, further comprising at least one fluid conduit, at least one of said heating channels having at least one area in parallel relation to the at least one fluid conduit.

6. The internal combustion engine of claim 5, wherein the fluid conduit is an oil conduit or a water conduit.

7. The internal combustion engine of claim 1, wherein the heating channels—as seen in a flow direction of the exhaust gas—extend in parallel relation to a main exhaust gas flow through the exhaust ports and the exhaust manifold, said heating channels configured to conduct exhaust gas from the inlet side to an outlet side which ends downstream of the inlet side in one of the exhaust ports or the exhaust manifold.

8. The internal combustion engine of claim 7, further comprising an exhaust-gas turbocharger having a turbine which is fluidly connected to the exhaust manifold downstream of a location where the outlet side ends downstream of the inlet side in one of the exhaust ports or the exhaust manifold.

9. The internal combustion engine of claim 1, further comprising an exhaust-gas turbocharger having a turbine which is fluidly connected to at least one of the heating channels for direct supply of exhaust gas to the turbine.

10. A method for operating an internal combustion engine, comprising:
    configuring exhaust ports of a cylinder head to feed into an exhaust manifold exhaust gas from combustion chambers of groups of combustion chambers arranged at opposite sides of the internal combustion engine;
    providing heating channels different from the exhaust ports and the exhaust manifold such that regions of the heating channels are formed by the cylinder head;
    associating the heating channels with the groups of the combustion chambers in one-to-one correspondence;
    configuring each of the heating channels with an inlet side which branches from one of the exhaust ports or from the exhaust manifold; and
    adjusting an exhaust gas mass flow flowing through the heating channels by actuators connecting the heating channels with the exhaust ports or the exhaust manifold.

11. The method of claim 10, further comprising opening the actuators when a fluid temperature of the internal combustion engine is smaller than an operating temperature.

12. The method of claim 11, wherein the fluid temperature is an oil temperature or water temperature.

13. The method of claim 10, further comprising conveying a fluid from a fluid reservoir through a fluid conduit which extends at least in part in parallel relation to the heating channels, and conveying the fluid back into the fluid reservoir.

\* \* \* \* \*